United States Patent
Haskara et al.

(10) Patent No.: US 12,145,610 B2
(45) Date of Patent: Nov. 19, 2024

(54) DISTRIBUTED EMBEDDED CONTROLLER IMPLEMENTATION FOR SELF-LEARNING CONTROLS

(71) Applicant: GM GLOBAL TECHNOLOGY OPERATIONS LLC, Detroit, MI (US)

(72) Inventors: Ibrahim Haskara, Macomb, MI (US); Bharatkumar Hegde, Bloomfield Hills, MI (US); Chen-Fang Chang, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 353 days.

(21) Appl. No.: 17/695,909

(22) Filed: Mar. 16, 2022

(65) Prior Publication Data
US 2023/0294718 A1 Sep. 21, 2023

(51) Int. Cl.
*B60W 50/06* (2006.01)
*B60W 50/00* (2006.01)
*G05B 13/02* (2006.01)

(52) U.S. Cl.
CPC .......... *B60W 50/06* (2013.01); *G05B 13/0265* (2013.01); *B60W 2050/0075* (2013.01)

(58) Field of Classification Search
CPC .......... B60W 50/06; B60W 2050/0075; G05B 13/0265
See application file for complete search history.

(56) References Cited

U.S. PATENT DOCUMENTS

| | | | |
|---|---|---|---|
| 11,922,735 B2 * | 3/2024 | Hashimoto | G07C 5/0808 |
| 2020/0398859 A1 * | 12/2020 | Borhan | F01N 3/2066 |
| 2021/0146790 A1 | 5/2021 | Haskara et al. | |
| 2022/0396139 A1 * | 12/2022 | Gassner | B60K 6/442 |
| 2023/0192063 A1 * | 6/2023 | Cronin | B60L 50/40 |
| | | | 701/22 |

OTHER PUBLICATIONS

Yong: Hybrid Electric Vehicle Energy Management With Computer Vision and Deep Reinforcement Learning (Year: 2021).*

* cited by examiner

*Primary Examiner* — Peter D Nolan
*Assistant Examiner* — Mikko Okechukwu Obioha (57) ABSTRACT

A distributed learning system of a vehicle includes: a control module configured to: control a plant of the vehicle using a policy; send signals to a learning module including information on an impact of the control on the plant; and selectively control the plant using exploratory control; and the learning module, where the learning module is separate from the control module and is configured to selectively update the policy based on (a) the signals from the control module, (b) state parameters resulting from the control of the plant using the policy, and (c) performance feedback determined based on the control of the plant using the policy and the selective control of the plant using exploratory control, where the control module is configured to receive the exploratory control from the learning module.

20 Claims, 9 Drawing Sheets

DISTRIBUTED EMBEDDED CONTROLLER IMPLEMENTATION FOR SELF-LEARNING CONTROLS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods associated with a distributed embedded controller system with reinforcement learning.

Some types of vehicles include only an internal combustion engine that generates propulsion torque. Hybrid vehicles include both an internal combustion engine and one or more electric motors. Some types of hybrid vehicles utilize the electric motor and the internal combustion engine to improve fuel efficiency. Other types of hybrid vehicles utilize the electric motor and the internal combustion engine to achieve greater torque output.

Examples of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine. The present application is applicable to electric vehicles, hybrid vehicles, and other types of vehicles.

SUMMARY

In a feature, a distributed learning system of a vehicle includes: a control module configured to: control a plant of the vehicle using a policy; send signals to a learning module including information on an impact of the control on the plant; and selectively control the plant using exploratory control; and the learning module, where the learning module is separate from the control module and is configured to selectively update the policy based on (a) the signals from the control module, (b) state parameters resulting from the control of the plant using the policy, and (c) performance feedback determined based on the control of the plant using the policy and the selective control of the plant using exploratory control, where the control module is configured to receive the exploratory control from the learning module.

In further features, the learning module is configured to selectively update the policy using reinforcement learning.

In further features, the signals include measured and estimated parameters for the plant.

In further features: the control module is configured to update the control of the plant at a first rate; and the learning module is configured to selectively update the policy at a second rate that is slower than the first rate.

In further features: the control module has a first memory demand; and the learning module has a second memory demand that is greater than the first memory demand.

In further features, the learning module is configured to selectively update the policy based on a horizon of the performance feedback over a predetermined period.

In further features, the learning module is onboard the vehicle.

In further features, the learning module is located remotely from the vehicle.

In further features, the learning module is configured to determine the exploratory control and transmit the exploratory control to the control module.

In further features: the plant is an energy storage system including a first power source and a second power source; and the control module is configured to control actuation of switches that connect and disconnect the first power source and the second power source to and from one or more loads.

In further features, the control module is configured to: determine a first percentage of a power demand to be requested from the first power source using the policy; determine a second percentage of the power demand to be requested from the second power source based on the first percentage; and control actuation of the switches based on the first and second percentages.

In further features, the exploratory control involves suboptimal control.

In further features: the control module is configured to cache (a), (b), and (c) over an entire first predetermined period and transmit the cached data to the learning module; and the learning module is configured to selectively update the policy based on the cached data.

In further features: the control module is configured to cache (a), (b), and (c) every second predetermined period and transmit the cached data to the learning module; and the learning module is configured to selectively update the policy based on the cached data.

In a feature, a distributed learning method for a vehicle includes: by a control module: controlling a plant of the vehicle using a policy; transmitting signals to a learning module including information on an impact of the control on the plant; selectively controlling the plant using exploratory control; and receiving the exploratory control from the learning module, where the learning module is separate from the control module; and by the learning module, selectively updating the policy based on (a) the signals from the control module, (b) state parameters resulting from the control of the plant using the policy, and (c) performance feedback determined based on the control of the plant using the policy and the selective control of the plant using exploratory control.

In further features, selectively updating the policy includes selectively updating the policy using reinforcement learning.

In further features, the signals include measured and estimated parameters for the plant.

In further features: controlling the plant includes updating the control of the plant at a first rate; and selectively updating the policy includes selectively updating the policy at a second rate that is slower than the first rate.

In further features: the control module has a first memory demand; and the learning module has a second memory demand that is greater than the first memory demand.

In further features, one of: the learning module is onboard the vehicle; and the learning module is located remotely from the vehicle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes multiple control modules that control different plants of the vehicle. Examples of plants include switches, electric motors, inverters, engines, hybrid energy storage systems, and other types of plants of the vehicle. A hybrid energy storage system includes two or more different types of power sources (e.g., a battery and a supercapacitor) that can be used independently to output power.

A control module can be configured to perform reinforcement learning on its own to provide better control. Control modules, however, may be resource (e.g., memory, computational effort, etc.) constrained as to prevent the use of reinforcement learning.

The present application involves distributed reinforcement learning. A control module executes a first portion of the reinforcement learning. A second module that is remote from the control module executes a second portion of the reinforcement learning and updates the control module. The second module may be another module of the vehicle or located remotely from the vehicle, such as in a remote server that communicates with the vehicle wirelessly.

Figure 1:
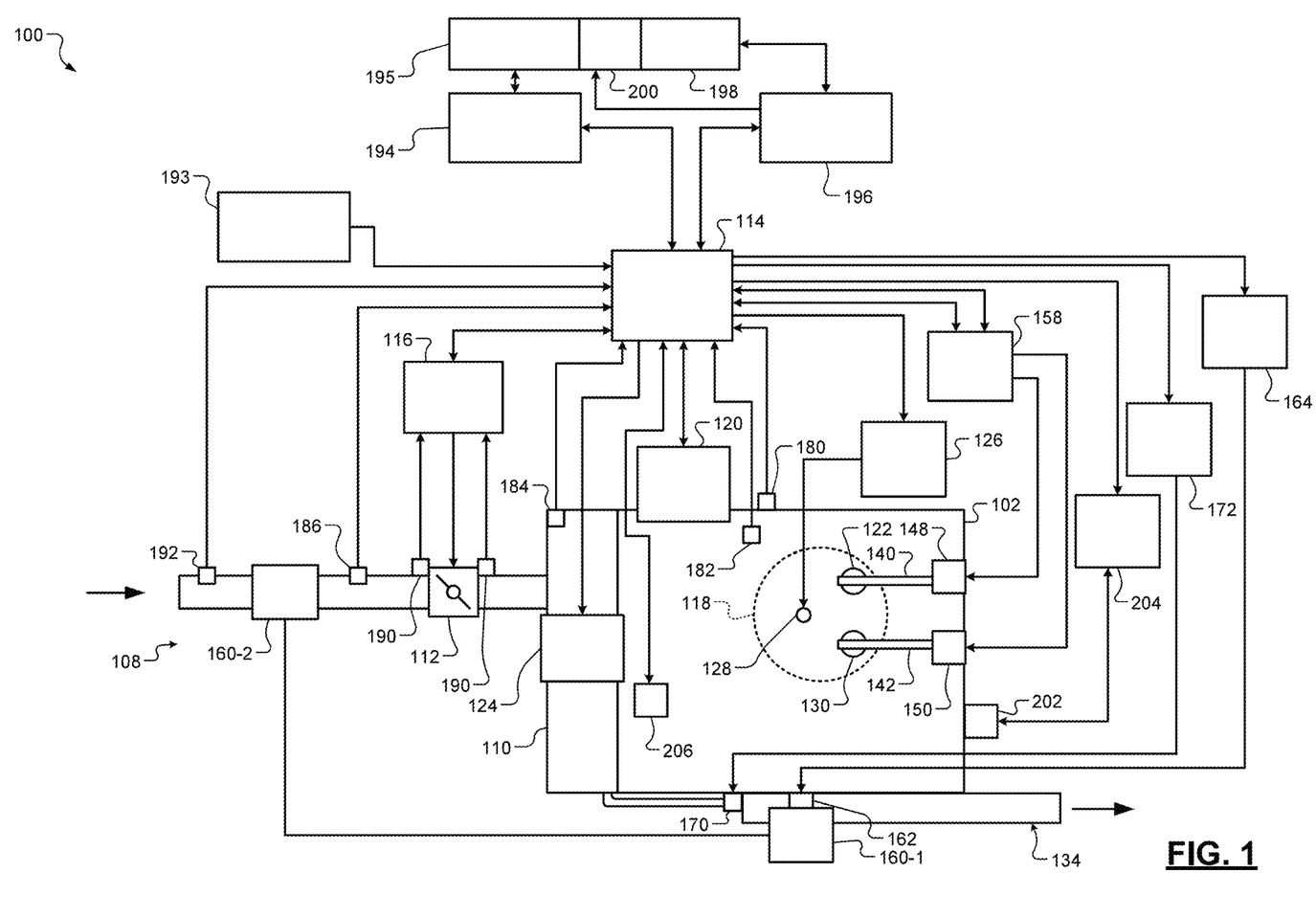
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198 (electric machine). While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a hybrid energy storage system (HESS) to the electric motor 198 to cause the electric motor 198 to output positive torque. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted. The present application is also applicable to the inclusion of multiple electric motors.

While example modules of a vehicle are discussed above, the vehicle may include other modules and/or one or more of the modules above may be omitted. Additionally, while the example implementation of a vehicle is provided, the present application is also applicable to non-vehicle examples. Also, while the example of a hybrid vehicle is provided, the present application is also applicable to electric vehicles, fuel cell vehicles, and other types of vehicles.

Figure 2:
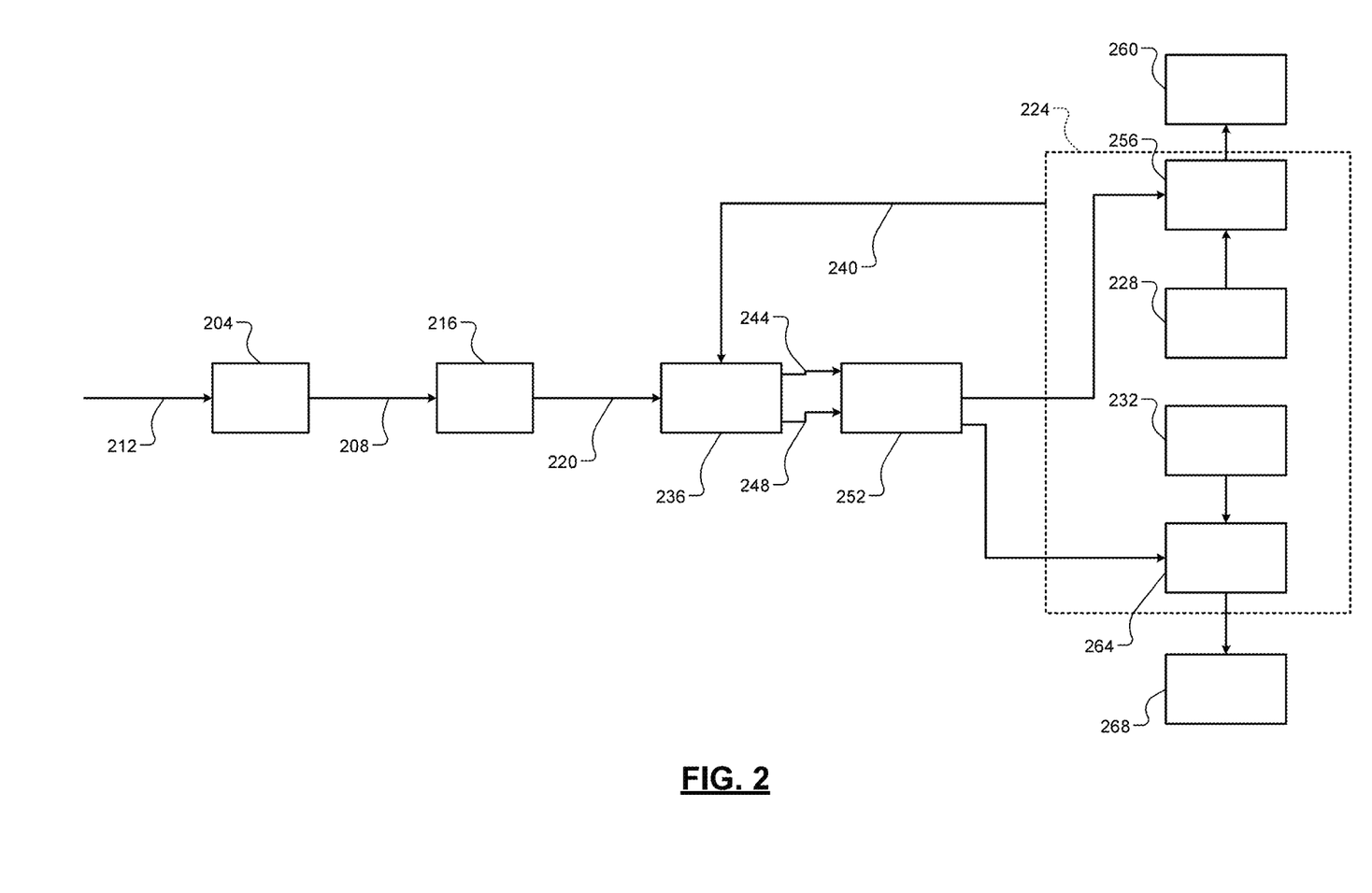
FIG. 2 is a functional block diagram of an example implementation of an energy management system.

FIG. 2 is a functional block diagram of an example implementation of an energy management system of the vehicle. While an example energy management system will be described, the present application is also applicable to other systems.

A request module 204 determines a torque request 208 based on one or more inputs, such as an accelerator pedal position (APP) 212. The request module 204 may determine the torque request using, for example, an equation or a lookup table that relates the inputs (e.g., APPs) to torque requests.

A power request module 216 determines a power request 220 based on the torque request 208. The power request module 216 may determine the power request 220 using, for example, an equation or a lookup table that relates torque requests to power requests. The power request 220 may be an amount of power requested from a HESS 224 that includes multiple different power sources, such as a battery 228, a supercapacitor (or power battery) 232, and/or one or more other suitable power sources that can be used to achieve the power request 220. In some examples, the HESS 224 may include multiple different instances of the same type of power source. Different power sources may have different chemistries and be used in different situations.

A distribution module 236 determines how the power request 220 should be distributed amongst the power sources of the HESS 224. For example, the distribution module 236 may determine a first percentage of the power request 220 that should be provided by the battery 228 and a second percentage of the power request 220 that should be provided by the supercapacitor 232. The distribution module 236 may determine the first percentage based on operating parameters 240 of the HESS 224, such as a state of charge, a battery voltage, a battery current, a supercapacitor voltage, a supercapacitor current, a loss, etc. The distribution module 236 may determine the first percentage using an equation or a lookup table. The distribution module 236 may set the second percentage based on or equal to 100 percent minus the first percentage.

The distribution module 236 generates a battery power request (batt) 244 based on the power request 220 and the first percentage. For example, the distribution module 236 may set the battery power request 244 based on or equal to the power request 220 multiplied by the first percentage. The distribution module 236 generates a supercapacitor power request (SC) 248 based on the power request 220 and the second percentage. For example, the distribution module 236 may set the supercapacitor power request 248 based on or equal to the power request 220 multiplied by the second percentage. One example of loads include powertrain/traction systems and heating ventilation and air conditioning (HVAC) systems. While an example environment of a HESS is provided, the present application is also applicable to other control systems.

A power control module 252 controls switching of a first one or more switches 256 based on the battery power request 244. In this manner, power flow from the battery 228 to load(s) 260 achieves the battery power request 244. The power control module 252 controls switching of a second one or more switches 264 based on the supercapacitor power request 248. In this manner, power flow from the supercapacitor 232 to load(s) 264 achieves the supercapacitor 232 power request 248. The load(s) 260 and 264 may be the same loads or may include one or more different loads.

Figure 3:
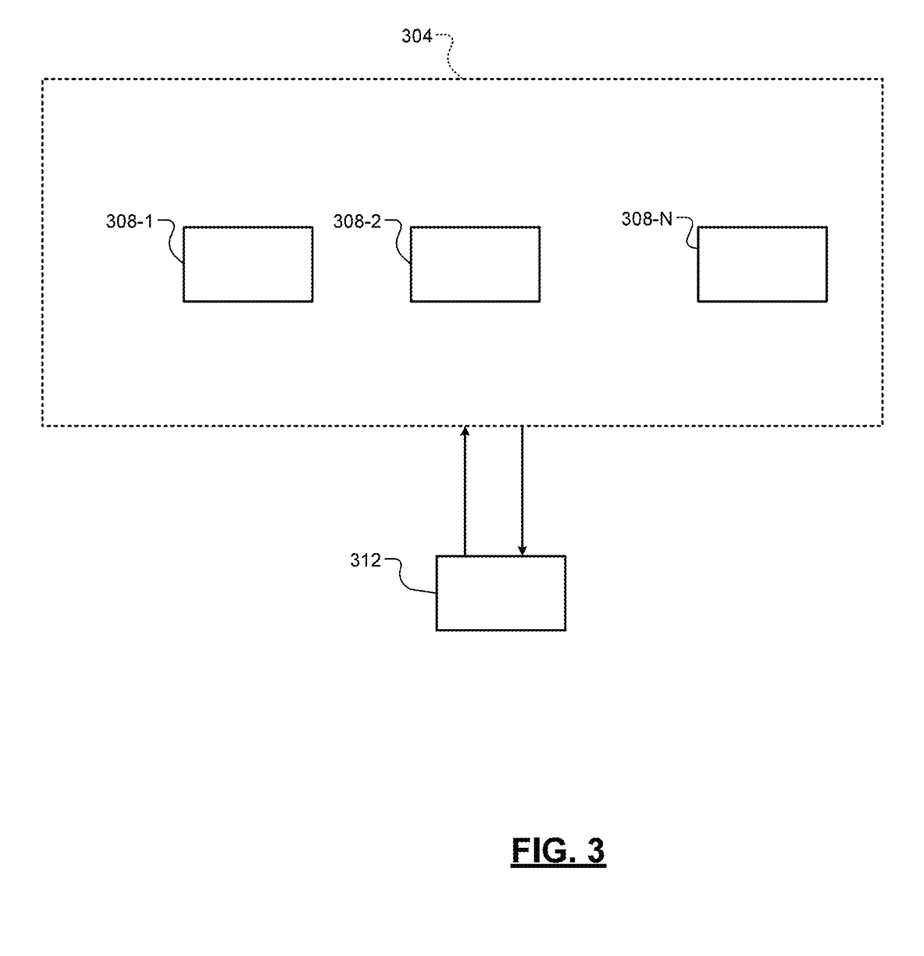
FIG. 3 is a functional block diagram of an example learning system.

FIG. 3 is a functional block diagram of an example learning system. The vehicle includes a runtime control mapping 304 that includes N different control modules 308-1, 308-2, . . . , 308-N (control modules 308). N is an integer greater than or equal to 2. The control modules 308 may be onboard modules and may be embedded controllers.

A learning module 312 is also included and is separate from the control modules 308. The learning module 312 may be part of the vehicle or may be remote from the vehicle (e.g., in a remote server) and communicate with the vehicle wirelessly, such as via a satellite, cellular, or other wireless communication network. The learning module 312 performs one portion of reinforcement learning, and the control modules 308, respectively, perform another portion of the reinforcement learning.

The system of FIG. 3 provides a distributed self-learning control architecture. Self-learning is split into and performed by multiple different modules. The self-learning may be implemented using a modified form of reinforcement learning, although the present application is also applicable to other types of learning and is not limited to reinforcement learning.

Figure 4:
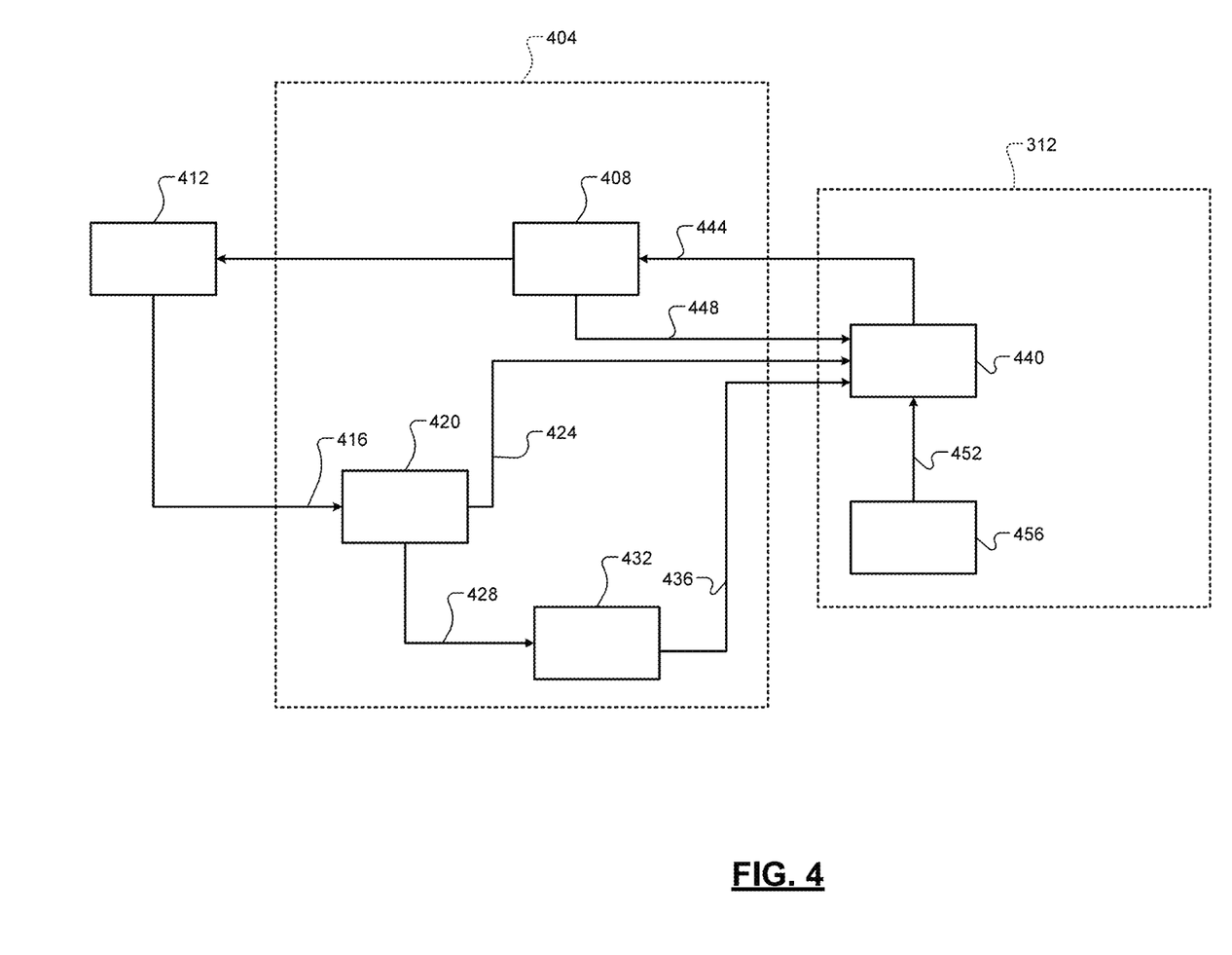
FIG. 4 is a functional block diagram of an example system including one control module and a learning module.

FIG. 4 is a functional block diagram of an example system including one of the control modules 308, which will be referred to as control module 404, and the learning module 312. While the example of the control module 404 and the learning module 312 will be discussed, the learning module 312 may interact with each other of the control modules 308 in the same way. The control module 404 has a first memory demand, and the learning module 312 has a second memory demand that is greater than the first memory demand.

The control module 404 includes an action module 408 that controls a plant 412 using a static policy U. The policy U may be described by the equation $U=\pi^*(S)$, where U is the policy, $\pi^*$ are the present variables, and S are state measurements and demands/requests. The policy includes a Q value matrix. The plant 412 may be, for example, an actuator of the vehicle. The action module 408 adjusts control of the plant 412 at a first rate, such as every X milliseconds where X is an integer greater than zero.

Operating parameters 416 of the plant 412 are input to a state and reward module. The operating parameters 416 may include measured and/or estimated parameters of the plant 412. Measured parameters may be measured using sensors. Estimated parameters may be estimated by estimation modules, for example, based on one or more measured parameters.

A state and reward module 420 determines state parameters 424 ($s_k$) based on the operating parameters 416, such as using one or more equations and/or lookup tables. The state and reward module 420 also determines one or more reward parameters 428 ($r_k$) based on the operating parameters 416, such as using one or more equations and/or lookup tables.

A horizon module 432 may determine a reward horizon 436 over a predetermined period based on the reward parameter(s) 428. In various implementations, the reward horizon 436 may include a time series of the reward parameter(s) 428 determined during the past predetermined period.

The learning module 312 includes a learning and adaptation module 440. The learning and adaptation module 440 determines (learns) learned parameters 444 for the policy used by the action module 408. The learned parameters 444 may include, for example, values for the Q value matrix. The action module 408 uses the learned parameters 444 to control the plant 412 once received. The learning and adaptation module 440 updates the learned parameters 444 at a second rate, such as every Y milliseconds where Y is an integer greater than zero and Y is greater than or equal to X. In other words, the second rate is slower (less frequent) or the same as than the first rate.

For the X values, the control module 404 executes its control loop, such as at a fastest rate at which the battery or vehicle is operated. The learning module 312 may execute at a slower rate, such as every 10 samples/loops of the control module 404 or in a event-driven mode (e.g., every discharge or regeneration, or at the end of a trip). In the example of end of trip, the info from key on to key off are transmitted to the learning module 312 (e.g., in a remote server), which may perform one time learning based on the performance of the entire trip.

The learning and adaptation module 440 may determine the learned parameters 444 based on action 448 taken by the action module 408, the state parameters 424, and the reward horizon 436 using one or more equations and/or lookup tables. In various implementations, the horizon module 432 may be omitted, and the learning and adaptation module 440 may determine the learned parameters 444 based on the action 448 of the action module 408, the state parameters 424, and the reward parameter(s) 428 using one or more equations and/or lookup tables. In the example of FIG. 2, the action 448 may include, for example, the first percentage which dictates how much of the power request 220 is supplied by the battery 228 and how much of the power request 220 is supplied by the supercapacitor 232.

The learning and adaptation module 440 may determine the learned parameters 444 using reinforcement learning and a learning rule. In various implementations, the learning rule may be described by

Q*(S,U), where S includes the state parameters and U includes the present parameters. Learning and adaptation rates 452 (e.g., α, γ, ε) may be fixed and provided by a rate module 456. In various implementations, the rate module 456 may vary one or more of the learning and adaptation rates 452. Here, U may be all possible values that the control can take (e.g. in HESS example, possible power-split values/percentages, S's are the states/demands/etc. Q has matrix with S and U are the input dimensions. For a given S and U, Q indicates a quality of applying U at that particular S. While system operates, the system moves through different S and U values and Q matrix keeps track of how reward was changing at various S's and U's. This is similar to a learning memory where learnings are stored in terms of Q-values over the visited S,U's. When a better control is determined at the current S, we the control module 404 may look through the possible Us and select the one with the highest Q-value. This is how Q-value may be used for learning updates.

In the example of FIG. 4, the control module 404 provides onboard control of the plant 412 including policy generation and policy application. The learning module 312 provides intermittent learning and adaptation of the control module 404. In this example, the reinforcement learning is split between the control module 404 and the learning module 312 based on memory demands and computational capabilities of the control module 404 and the learning module 312.

Generally speaking, the control module 404 implements control and caching. The control module 404 may implement best policy mapping π*(S)→U on the plant 412 and monitors the effect of the control via the reward 428. The action module 408 may periodically (e.g., at a predetermined rate) implement exploratory control Ux and cache the state parameters 424 and the reward parameter(s) 428 resulting from the exploratory control. The exploratory control may include deviating from the policy for learning. The control module 404 may communicate the cached states, actions, and reward tuples for a predetermined period to the learning module 312 to update the learned parameters 444. The exploratory control may involve suboptimal control relative to a best control action from the policy.

The learning module 312 may determine the learned parameters 444 based on the cached data communicated and also supervise adaptive learning. The learning and adaptation module 440 updates the current policy mapping of the action module 408 (U=Q(s,u)) based on the cached data communicated by the control module 404. The learning and adaptation module 440 may determine a best policy $$u_c = \max_u Q(s_c, u)$$

and transmits the updated part of the policy π*(S)→U, the ser of ($s_c$, $u_c$) back to the control module 404. The learning and adaptation module 440 also communicates the set of exploratory control $U_x$ for the next update of the policy to the control module 404.

Described herein are examples of the use of two separate maps Q*(S,U) for learning and π*(S)→U for the onboard policy at two different places/modules. Learning can be done at intermittent steps, such as slower than the rate of control of the plant. To do this, cumulative reward Hp may be used and avoid causality. In another example, episode replay may be used.

Figure 5:
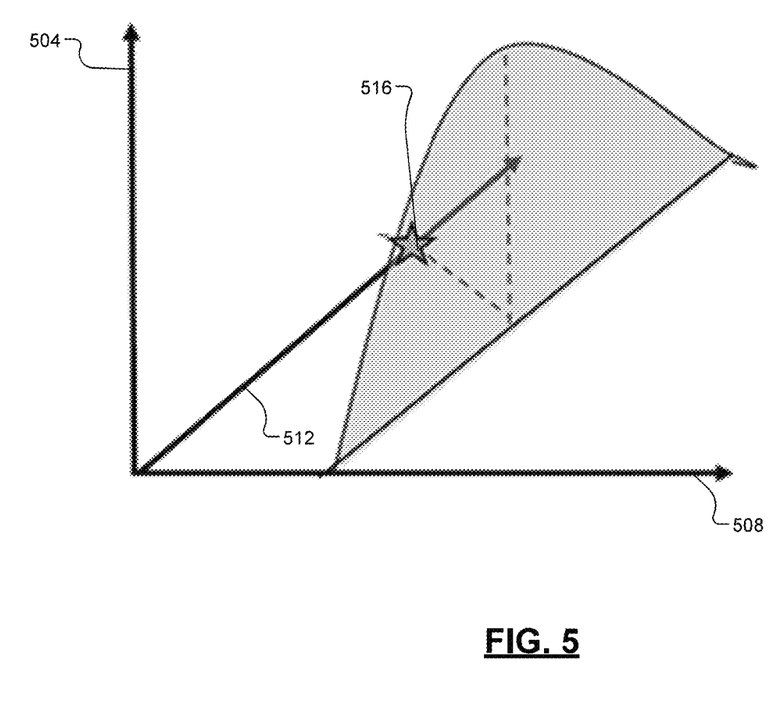
FIG. 5 is an example graph of Q values versus states and an input (control action)

FIG. 5 is an example graph of Q values (s,a) 504 versus states 508 and an input (u) 512. The learning and adaptation module 440 may determine a best policy $$u_c = \max_u Q(s_c, u) = \pi(s_c),$$

which is illustrated by 516 in the example of FIG. 5.

The learning and adaptation module 440 for reinforcement learning updates the policy and value (Q matrix) based on the observed reward. The implementation of reinforcement learning may be computationally and memory intensive due to the size of the Q matrix, which may scale by the number of discrete inputs and states. The present application involves distributed reinforcement learning between the learning module 312 and the control module 404 to balance the memory and computational efforts and includes changes relative to traditional reinforcement learning due to the control module 404 operating at the first rate and the learning module 312 operating at the second (slower) rate.

The learning rule for the distributed reinforcement learning described herein may be described by the following.

$$Q(s_k, u_k) = r(s_k, u_k) + \sum_{i=1}^{N-1} r(s_{k+i}, a_{k+i}) + Q(s_{k+N}, a_{k+N})$$

$$Q(s_k, u_k) + H(s, u, N) + Q(s_{k+N}, u_{k+N})$$

$$H(s, u, N) = \sum_{i=1}^{N-1} r(s_{k+i}, u_{k+i}),$$

being the cumulative forecasted reward within two intermittent learning points.

$$Q(s_k, u_k) \leftarrow [1 - \alpha]Q(s_k, u_k) + \alpha\left[H(s_k, u_k) + \gamma \max_{u'} Q(s', u')\right].$$

The cumulative performance reward may not be computable and may be noncausal. The following cached update rule may therefore be used.

The learning and adaptation module 440 may update $Q(s_k, u_k)$ at a future time step k+N. This allows the determination of $H(s_k, u, N)$ by the horizon module 432 based on actual measurements at the future time step. This may be equivalent to updating $Q(s_{k-N}, u_{k-N})$ at present time k. The buffer with the most recent N-step states and input data can be used by the horizon module 432 to determine H(s,u,N) with measured states and update the previous $Q(s_{k-N}, u_{k-N})$ entry at present time k. In this manner, the learning is updated at the previous states/inputs with the most current cumulative reward.

Generally speaking, the control module 404 may continuously update $H_p$ and send $H_p$, $s_{k-N}$, and $u_{k-N}$ to the learning module 312. Based on the received data, the learning module 312 performs learning at the intermittent points (e.g., every predetermined period) to determine the learned parameters at $s_{k-N}$ and $u_{k-N}$. The learning module 312 determines $u_k$ based on the received data and transmits $u_k$ to the control module 404. The control module 404 updates the policy mapping U=π*(S) at $s_k$, $u_k$ then uses the updated policy to control the plant 412.

Figure 6:
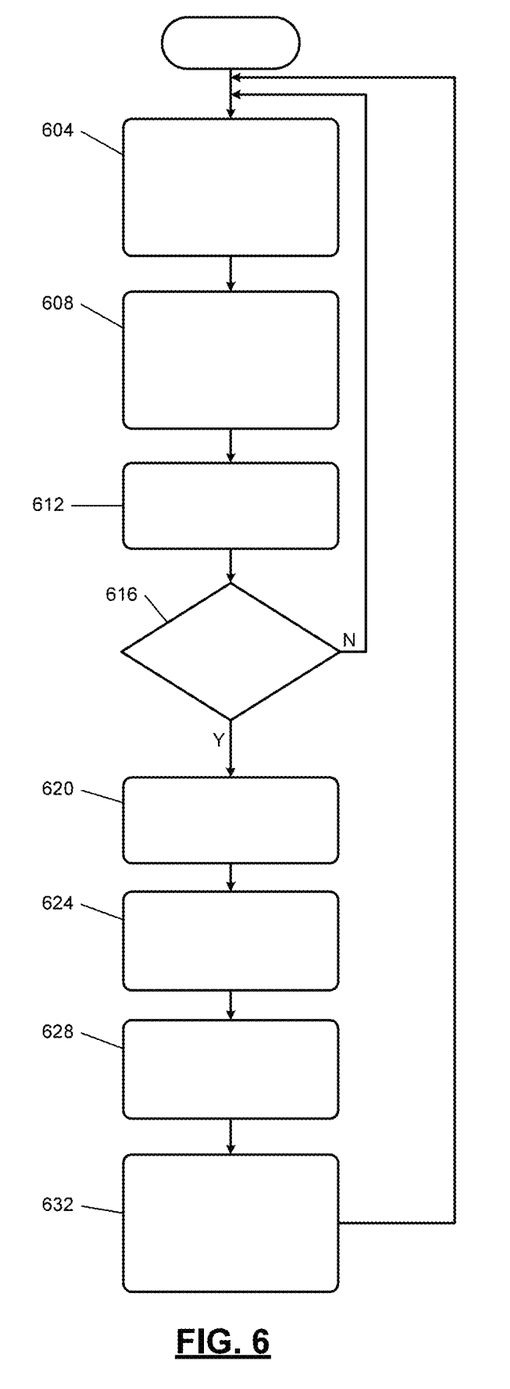
FIGS. 6-9 are flowcharts depicting example methods of performing reinforcement learning using multiple different modules.

FIG. 6 is a flowchart depicting an example method of distributed learning using a cumulative reward. Control begins at 604 where the control module 404 (Module 1) controls the plant 412 using the policy U=π*(S) and exploratory control set $U_x(S)$. At 608, the control module 404 updates the cumulative reward $H_p$ resulting from the use of the policy. At 612, the control module 404 caches (stores) the state parameters, the action, and the reward parameter(s).

At 616, the control module 404 determines whether a predetermined period has passed. For example, the control module 404 may determine whether 10 or another predetermined number of loops of 604-612 have been performed. If 616 is false, control returns to 604. If 616 is true, control continues with 620.

At 620, the control module 404 transmits the stored data to the learning module 312 (module 2). At 624, based on the stored data received, the learning module 312 learns (e.g., Q value matrix updating) at the intermittent points for states and actions $s_{k-N}$ and $u_{k-N}$.

At 628, the learning module 312 determines the learned parameters for updating the policy based on the learned data at the intermittent points and the stored data received. At 632, the learning module 312 transmits the learned parameters 444 and an exploratory control dataset to the control module 404.

Figure 7:
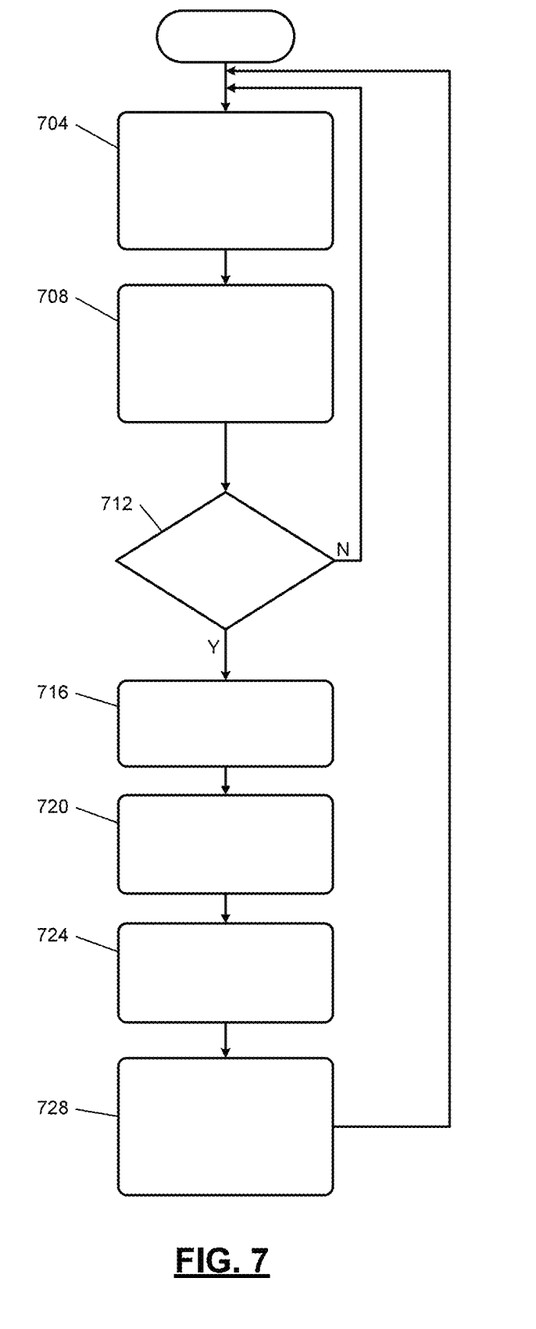

FIG. 7 is a flowchart depicting an example method of distributed learning using episode replays. Control begins at 704 where the control module 404 (Module 1) controls the plant 412 using the policy U=π*(S) and exploratory control set $U_x(S)$. At 708, the control module 404 caches (stores) the state parameters, the action, and the reward parameter(s) resulting from the used control.

At 712, the control module 404 determines whether a predetermined period has passed. For example, the control module 404 may determine whether 10 or another predetermined number of loops of 704-708 have been performed. If 712 is false, control returns to 704. If 712 is true, control continues with 716.

At 716, the control module 404 transmits the stored data to the learning module 312 (module 2). At 720, based on the stored data received, the learning module 312 learns (e.g., Q value matrix updating) at the intermittent points for states and actions $s_{k-N}$ and $u_{k-N}$.

At 724, the learning module 312 determines the learned parameters 444 for updating the policy based on the learned data at the intermittent points and the stored data received. At 728, the learning module 312 transmits the learned parameters 444 and an exploratory control dataset to the control module 404.

Figure 8:
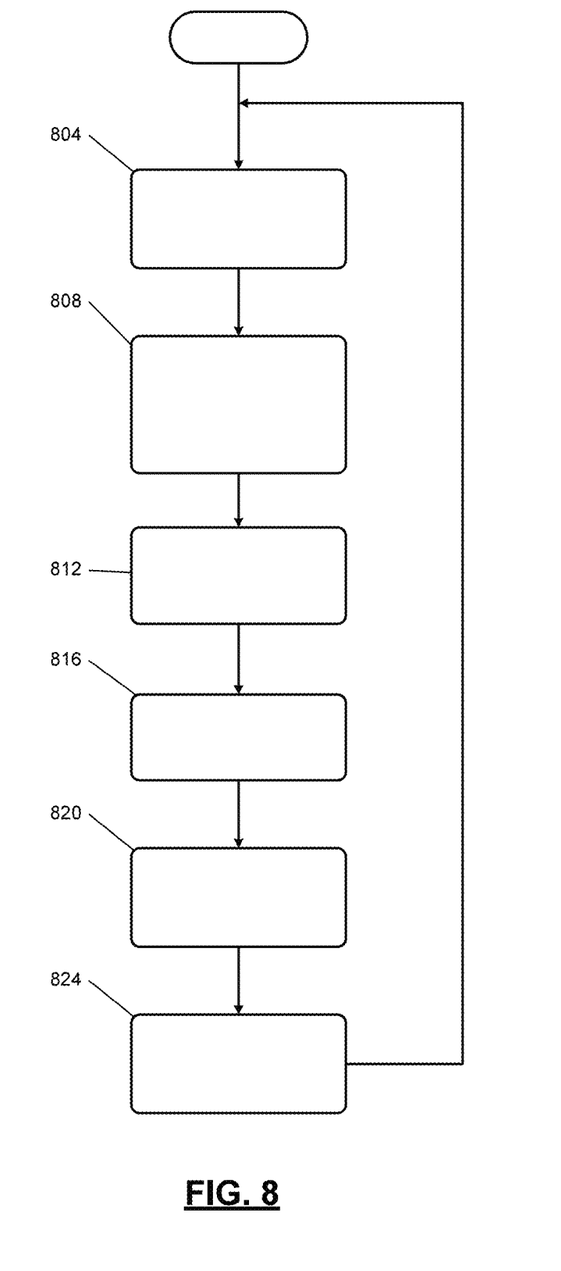

FIG. 8 is a flowchart depicting an example method of distributed learning using a cumulative reward for the example system of FIG. 2. Control begins at 804 where the control module 404 (Module 1) controls the plant 412 using the policy U=π*(S) and exploratory control set $U_x(S)$. The control module 404 also measures and quantizes the state parameters, such as the power demands, the SOC, the voltage of the supercapacitor, the voltage of the battery, etc.

At 808, the control module 404 determines the power distribution (e.g., the first and second percentages, u) using the policy (u*=π*S). At 812, the control module 404 determines the reward r resulting from the control based s, u. The control module 404 may determine the reward, for example, based on a power loss of the supercapacitor (e.g., determined based on resistance of the supercapacitor and squared current of the supercapacitor), a power loss of the battery (e.g., determined based on resistance of the battery and squared current of the battery), a throughput (e.g., determined based on a magnitude of the battery current), a battery loss, a change in SOC, and/or one or more other parameters. Rewards may be determined using one or more equations and/or lookup tables. At 816, the control module updates the cumulative reward $H_p(s_{k-N}, u_{k-N})$ with the reward over the horizon.

The control module 404 may determine whether a predetermined period has passed. For example, the control module 404 may determine whether 10 or another predetermined number of loops of 804-816 have been performed.

If so, the control module 404 transmits the stored data to the learning module 312 (module 2).

At 820, the learning module 312 updates the Q-value matrix at the intermittent points $s_{k-N}$, $u_{k-N}$ based on the received data. The learning module 312 updates the policy using the learned parameters of the Q-value matrix at 824, and control may return to 804. The learning module 312 may increment a learning instances counter (e.g., k=k+1) and learn until the counter exceeds a predetermined value.

Figure 9:
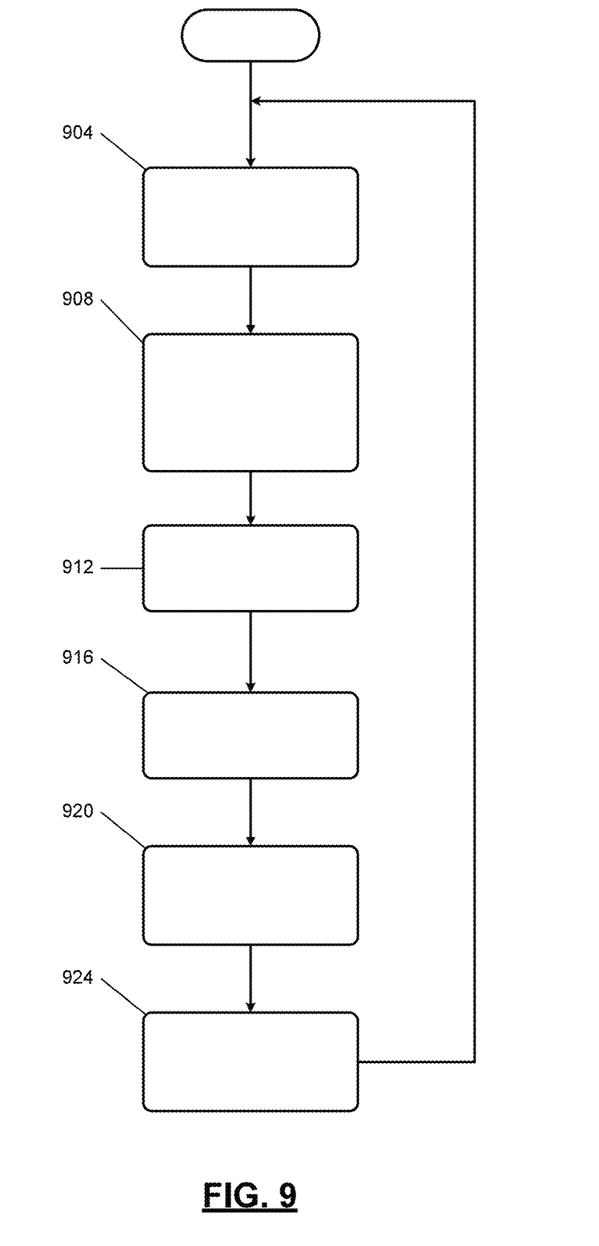

FIG. 9 is a flowchart depicting an example method of distributed learning using a cumulative reward for the example system of FIG. 2. Control begins at 904 where the control module 404 (Module 1) controls the plant 412 using the policy U=π*(S) and exploratory control set $U_x(S)$. At 908, the control module 404 determines the cumulative reward $H_p$ with the present (most recently updated) policy.

At 912, the control module 404 transmits the cumulative reward and the other cached data (e.g., $s_{k-N}$, $u_{k-N}$) to the learning module 312 (module 2). At 916, the learning module 312 learns at the intermittent points $s_{k-N}$, $u_{kN}$ (e.g., the Q value matrix). At 920, the learning module 312 determines the learned parameters based on the received data and transmits the learned parameters to the control module 404. At 924, the control module 404 updates the policy to include the learned parameters, and control returns to 904.

Examples of reinforcement learning include Q-learning, SARSA, and other types of reinforcement learning. While rewards are discussed, the present application is also applicable to other types of performance feedback. In the above equations, examples of Q-value are provided. The present application is also applicable to other ways of storing the learning instead of using a Q-value matrix. For example, a deep neural network (DNN) can be used to perform the functions of the Q-matrix described herein. For DNNs, the learning will be stored through the DNN weights, such as e.g., weights or hyperparameters of DNNs will be updated to store learning.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A distributed learning system of a vehicle, comprising:
   a control module configured to:
      control a plant of the vehicle using a policy;
      send signals to a learning module including information on an impact of the control on the plant; and
      selectively control the plant using exploratory control; and
   the learning module, wherein the learning module is separate from the control module and is configured to selectively update the policy based on (a) the signals from the control module, (b) state parameters resulting from the control of the plant using the policy, and (c) performance feedback determined based on the control of the plant using the policy and the selective control of the plant using exploratory control,
   wherein the control module is configured to receive the exploratory control from the learning module,
   wherein the exploratory control includes deviating from the policy for learning.

2. The distributed learning system of claim 1 wherein the learning module is configured to selectively update the policy using reinforcement learning.

3. The distributed learning system of claim 1 wherein the signals include measured and estimated parameters for the plant.

4. The distributed learning system of claim 1 wherein:
   the control module is configured to update the control of the plant at a first rate; and
   the learning module is configured to selectively update the policy at a second rate that is slower than the first rate.

5. The distributed learning system of claim 1 wherein:
   the control module has a first memory demand; and
   the learning module has a second memory demand that is greater than the first memory demand.

6. The distributed learning system of claim 1 wherein the learning module is configured to selectively update the policy based on a horizon of the performance feedback over a predetermined period.

7. The distributed learning system of claim 1 wherein the learning module is onboard the vehicle.

8. The distributed learning system of claim 1 wherein the learning module is located remotely from the vehicle.

9. The distributed learning system of claim 1 wherein the learning module is configured to determine the exploratory control and transmit the exploratory control to the control module.

10. The distributed learning system of claim 1 wherein:
    the plant is an energy storage system including a first power source and a second power source; and
    the control module is configured to control actuation of switches that connect and disconnect the first power source and the second power source to and from one or more loads.

11. The distributed learning system of claim 10 wherein the control module is configured to:
    determine a first percentage of a power demand to be requested from the first power source using the policy;
    determine a second percentage of the power demand to be requested from the second power source based on the first percentage; and
    control actuation of the switches based on the first and second percentages.

12. The distributed learning system of claim 1 wherein the exploratory control involves suboptimal control.

13. The distributed learning system of claim 1 wherein:
    the control module is configured to cache (a), (b), and (c) over an entire first predetermined period and transmit the cached data to the learning module; and
    the learning module is configured to selectively update the policy based on the cached data.

14. The distributed learning system of claim 1 wherein:
    the control module is configured to cache (a), (b), and (c) every second predetermined period and transmit the cached data to the learning module; and
    the learning module is configured to selectively update the policy based on the cached data.

15. A distributed learning method for a vehicle, comprising:
    by a control module:
       controlling a plant of the vehicle using a policy;
       transmitting signals to a learning module including information on an impact of the control on the plant;
       selectively controlling the plant using exploratory control; and
       receiving the exploratory control from the learning module,
    wherein the learning module is separate from the control module; and by the learning module, selectively updating the policy based on (a) the signals from the control module, (b) state parameters resulting from the control of the plant using the policy, and (c) performance feedback determined based on the control of the plant using the policy and the selective control of the plant using exploratory control, wherein the exploratory control includes deviating from the policy for learning.

16. The distributed learning method of claim 15 wherein selectively updating the policy includes selectively updating the policy using reinforcement learning.

17. The distributed learning method of claim 15 wherein the signals include measured and estimated parameters for the plant.

18. The distributed learning method of claim 15 wherein:
controlling the plant includes updating the control of the plant at a first rate; and
selectively updating the policy includes selectively updating the policy at a second rate that is slower than the first rate.

19. The distributed learning method of claim 15 wherein:
the control module has a first memory demand; and
the learning module has a second memory demand that is greater than the first memory demand.

20. The distributed learning method of claim 15 wherein one of:
the learning module is onboard the vehicle; and
the learning module is located remotely from the vehicle.

* * * * *